United States Patent
Munier et al.

(10) Patent No.: US 11,316,611 B2
(45) Date of Patent: Apr. 26, 2022

(54) COMPACT DOWNLINK CONTROL INFORMATION MESSAGES

(71) Applicant: Telefonaktiebolaget LM Ericsson (publ), Stockholm (SE)

(72) Inventors: Florent Munier, Västra Frölunda (SE); Kittipong Kittichokechai, Järfälla (SE); Alexey Shapin, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/500,246

(22) PCT Filed: Feb. 18, 2019

(86) PCT No.: PCT/SE2019/050145
§ 371 (c)(1),
(2) Date: Oct. 2, 2019

(87) PCT Pub. No.: WO2019/160499
PCT Pub. Date: Aug. 22, 2019

(65) Prior Publication Data
US 2021/0119722 A1    Apr. 22, 2021

(30) Foreign Application Priority Data
Feb. 16, 2018    (SE) .................... 1800044-8

(51) Int. Cl.
*H04L 1/00*       (2006.01)
*H04L 1/18*       (2006.01)
(Continued)

(52) U.S. Cl.
CPC .......... *H04L 1/0004* (2013.01); *H04L 1/1819* (2013.01); *H04W 72/042* (2013.01); *H04W 72/1263* (2013.01); *H04W 72/1289* (2013.01)

(58) Field of Classification Search
CPC ..... H04L 1/001; H04L 1/0072; H04L 5/0053; H04L 5/0042; H04L 5/0051; H04L 1/00;
(Continued)

(56) References Cited

U.S. PATENT DOCUMENTS 9,955,465 B2 * 4/2018 He ...................... H04L 5/0044
10,143,036 B2    11/2018 Khan
(Continued)

FOREIGN PATENT DOCUMENTS

WO    2016053026 A1    4/2016
WO    2017014549 A1    1/2017

OTHER PUBLICATIONS

International Search Report and Written Opinion dated Apr. 23, 2019 for International Application No. PCT/SE2019/050145 filed Feb. 18, 2019, consisting of 11-pages.
(Continued)

*Primary Examiner* — Man U Phan
(74) *Attorney, Agent, or Firm* — Christopher & Weisberg, P.A.

(57) ABSTRACT

A method, network node and wireless device are disclosed. According to one aspect, a network node is configured to select between a first mode of operation and a second mode of operation. The first mode of operation includes generating a first downlink control information (DCI) message having a first number of bits. The second mode of operation includes selecting or generating a second DCI message having a second number of bits less that the first number of bits in at least one of the following fields: a redundancy version (RV) field, a modulation and coding scheme (MCS) field and a hybrid automatic repeat request (HARQ) process field.

14 Claims, 8 Drawing Sheets

(51) Int. Cl.
*H04W 72/04* (2009.01)
*H04W 72/12* (2009.01)

(58) Field of Classification Search
CPC .... H04L 5/00; H04W 72/042; H04W 84/042; H04W 72/1289; H04W 72/1268; H04W 72/04; H04W 72/12
USPC .......................................................... 370/329
See application file for complete search history.

(56) References Cited

U.S. PATENT DOCUMENTS

| | | | |
|---|---|---|---|
| 10,143,037 B2 | 11/2018 | Khan | |
| 10,278,227 B2 | 4/2019 | Wang et al. | |
| 10,542,530 B2* | 1/2020 | Chen | H04L 5/0053 |
| 10,637,613 B2* | 4/2020 | Noh | H04L 1/1896 |
| 10,652,872 B2* | 5/2020 | You | H04W 74/08 |
| 10,673,566 B2* | 6/2020 | Aiba | H04W 76/27 |
| 10,694,496 B2* | 6/2020 | Won | H04W 72/005 |
| 2013/0114505 A1 | 5/2013 | Haim et al. | |
| 2013/0272229 A1 | 10/2013 | Dinan | |
| 2016/0100422 A1* | 4/2016 | Papasakellariou | H04L 1/1861 370/329 |
| 2018/0063820 A1 | 3/2018 | Xiong et al. | |
| 2018/0192404 A1 | 7/2018 | Maaref et al. | |
| 2018/0242391 A1 | 8/2018 | Khan | |
| 2019/0075604 A1 | 3/2019 | Wang et al. | |
| 2019/0149269 A1 | 5/2019 | Chatterjee et al. | |
| 2019/0149379 A1 | 5/2019 | Xiong et al. | |
| 2019/0159153 A1 | 5/2019 | Zhang et al. | |
| 2019/0159193 A1 | 5/2019 | Zhang et al. | |
| 2019/0165971 A1 | 5/2019 | Manolakos et al. | |
| 2019/0191453 A1 | 6/2019 | Xiong et al. | |
| 2019/0200359 A1 | 7/2019 | Choi et al. | |
| 2019/0223160 A1* | 7/2019 | He | H04W 68/005 |
| 2019/0261399 A1* | 8/2019 | Munier | H04L 5/0053 |
| 2019/0268207 A1* | 8/2019 | Al-Imari | H04L 1/1864 |
| 2020/0100229 A1* | 3/2020 | Chen | H04W 72/042 |
| 2020/0128621 A1* | 4/2020 | Chang | H04L 1/1819 |
| 2020/0275421 A1* | 8/2020 | Yang | H04L 1/189 |

OTHER PUBLICATIONS

3GPP TSG RAN WG1 Meeting #92 R1-181687; Title: DL control channel enhancement for HRLLC; Agenda Item: 6.2.7.2.1; Source: MediaTek Inc.; Document for: Discussion and Decision; Location and Date: Athens, Greece, Feb. 26-Mar. 2, 2018, consisting of 4-pages.

3GPP TSG RAN WG1 Meeting AH 1801 R1-1800960; Title: On Compact DCI for URLLC; Agenda Item: 7.9; Source: Ericsson; Document for: Information; Location and Date: Vancouver, Canada, Jan. 22-26, 2018, consisting of 5-pages.

3GPP TSG RAN WG1 Meeting #92 R1-1801548; Title: Discussion on compact DCI for URLLC; Source: vivo; Agenda Item: 7.2.2; Document for: Discussion and Decision; Location and Date Athens, Greece, Feb. 26-Mar. 2, 2018, consisting of 5-pages.

3GPP TS 36.213 V15.4.0; 3rd Generation Partnership Project; Technical Specification Group Radio Access Network; Evolved Universal Terrestrial Radio Access (E-UTRA); Physical layer procedures (Release 15); Dec. 2018, consisting of 550-pages.

Indian Office Action dated Sep. 10, 2021 for Patent Application No. 202047034806, consisting of 7-pages.

U.S. Office Action dated Jul. 9, 2019 for Application No. 16355082, consisting of 22 pages.

* cited by examiner

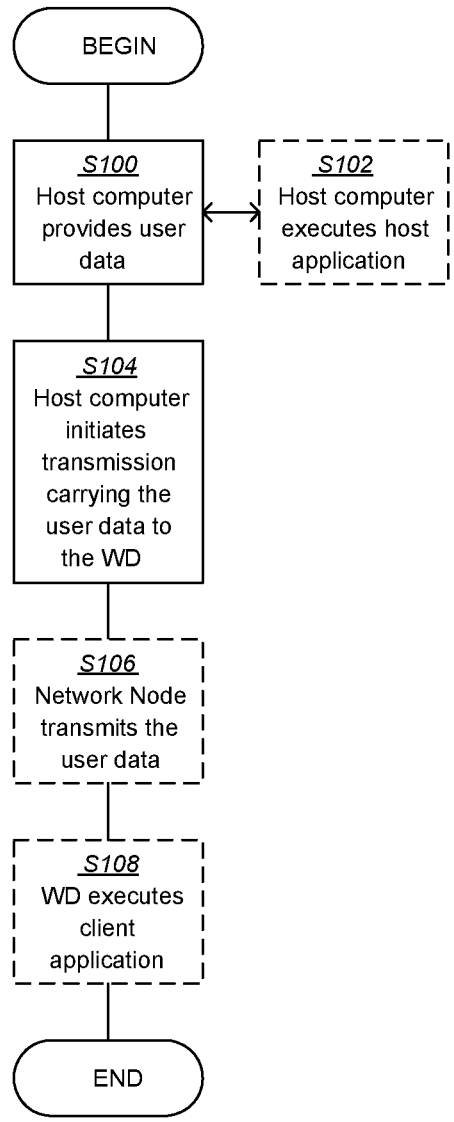
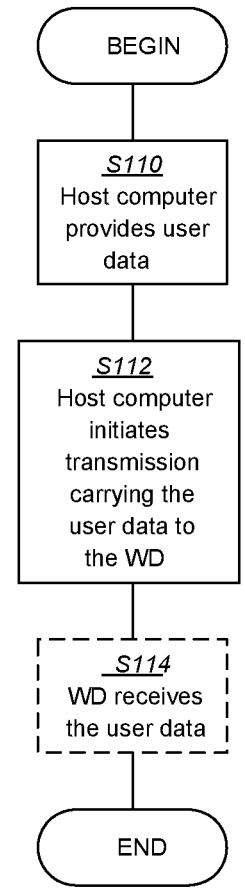
FIG. 7
FIG. 8

COMPACT DOWNLINK CONTROL INFORMATION MESSAGES

CROSS-REFERENCE TO RELATED APPLICATIONS

This application is a Submission Under 35 U.S.C. § 371 for U.S. National Stage Patent Application of International Application No. PCT/SE2019/050145, filed Feb. 18, 2019 entitled "COMPACT DOWNLINK CONTROL INFORMATION MESSAGES," which claims priority to Swedish Application No. 1800044-8, filed Feb. 16, 2018, the entireties of both of which are incorporated herein by reference.

FIELD

The present disclosure relates to wireless communications, and in particular, to generating and signaling a compact downlink control information (DCI) message by formatting at least one of a redundancy version (RV) field, a modulation and coding scheme (MCS) field and a hybrid automatic repeat request (HARD) process field.

BACKGROUND

Long Term Evolution (LTE) and New Radio (NR) (also known as "5G") communication networks, wireless devices (WDs) and network nodes, provide for data transmission controlled by the network nodes using grants containing, among other things, the details of allocated spectrum resources and the modulation and coding scheme to be used to transmit over those resources. The modulation and coding scheme (MCS) is signaled in the downlink control information (DCI). DCI messages are typically sent over the Physical Downlink Control Channel (PDCCH). An example of this process in the downlink (DL), i.e., from the network node to the WD, and the uplink (UL), i.e., from the WD to the network node, is shown in FIG. 1.

The modulation and coding scheme field is an index pointing to entries in the MCS table in the Third Generation Partnership Project (3GPP) specification, which, once combined with the resource allocation, will result in the transport block size (TBS) that will be transmitted. In legacy systems, the reason for a range of values for the MCS is that the ability of the WD to reliably receive or transmit depends on its location in the cell. A WD near the network node has a low path loss and can be scheduled with a high order of modulation. In contrast, a WD at the cell edge faces both high path loss and intercell interference, so that the transmission must be coded with a stronger code rate and transmitted with a lower order of modulation.

In LTE and NR, a framework for ultra-reliable, low latency communication (URLLC) is being standardized. In such a framework, WDs are expected to transmit at very low error rate (on the order of 0.001 percent) within very tight latency bounds (down to 1 ms). The payload is expected to be very small, on the order of hundreds of bits (one use case is 32 bytes). In systems where reliability is key, such as URLLC, having an unnecessarily large DCI can lead to performance and efficiency issues.

SUMMARY

Some embodiments advantageously provide methods, network nodes and wireless devices for generating and signaling compact DCI messages. Compact DCI messages can be achieved by generating fields of the DCI message with reduced numbers of bits. Such fields where bits may be reduced include the redundancy version (RV) field, the modulation and coding scheme (MCS) field and the hybrid automatic repeat request (HARQ) process field.

In the case of URLLC, it is possible to design a set of MCS indices that achieve a low error rate (and therefore a very low code rate) and achieve compact signaling (and therefore a small MCS table). Low code rates are needed for the scheduled physical downlink shared channel (PDSCH) transmission to be reliable and smaller MCS tables will allow the control channel, such as the physical downlink control channel (PDCCH) or short PDCCH (sPDCCH), to be more reliable, even in a single transmission.

At the same time, a hybrid automatic repeat request (HARQ) process for low latency systems having a short transmission time interval (TTI), contains up to 16 HARQ processes and takes up to 4 bits in the DCI control signaling. Some embodiments may include a reduced HARQ process field size. Some embodiments may also include reduced MCS and transport block size (TBS) tables based on the existing MCS/TBS tables in current 3GPP specifications. The MCS/TBS tables can be designed for a certain use, and the network operator can decide how and when to apply that design. The MCS field in DCI can be reduced to a smaller number of bits, e.g., 3 or 4 bits, which can be interpreted by the WD based on configuration or dynamic observations. The HARQ process field in DCI can be reduced as well, because the retransmission timeline is much shorter for URLLC and there is only a small chance for HARQ processes overlapping.

The transmission of the MCS and HARQ process field may be more compact and therefore more efficient channel coding can be applied, improving the reliability of the control channel. The new MCS values are focused toward lower code rates, improving the reliability of the downlink shared channel.

Accordingly, some embodiments include a network node configured to communicate with a wireless device, WD. The network node is configured to select between a first mode of operation and a second mode of operation. The network node is further configured to operate in the selected mode. The first mode of operation includes selecting or generating a first DCI message having a first number of bits. The second mode of operation includes selecting or generating a second DCI message having a second number of bits less than the first number of bits in at least one of the following fields: an MCS field, an RV field, and a HARQ process field.

According to this aspect, in some embodiments, the first and second DCI messages include scheduling messages for scheduling a data transmission or a physical downlink shared channel, PDSCH, transmission. In some embodiments, the second DCI message has fewer than 5 MCS bits and indicates a subset of a table of configurable modulation and coding schemes. In some embodiments, a subset of modulation and coding schemes is selected based on a measure of channel quality. In some embodiments, the RV field has one bit or no bit, one bit indicating two RVs and no bit indicating one RV. In some embodiments, the HARQ process field has two bits, one bit or no bit, indicating four, two or one HARQ processes, respectively.

According to another aspect, a method implemented in a network node is provided. The method includes selecting between a first mode of operation and a second mode of operation. The method also includes operating in the selected mode. The first mode of operation includes selecting or generating a first DCI message having a first number of bits. The second mode of operation including selecting or generating a second DCI message having a second number of bits less than the first number of bits in at least one of the following fields: an MCS field, an RV field, and a HARQ process field.

According to this aspect, in some embodiments, the first and second DCI messages include scheduling messages for scheduling a data transmission or a physical downlink shared channel, PDSCH. In some embodiments, the second DCI message has fewer than 5 MCS bits and indicates a subset of a table of configurable modulation and coding schemes. In some embodiments, a subset of modulation and coding schemes is selected based on a measure of channel quality. In some embodiments, the RV field has one bit or no bit, one bit indicating two RVs and no bit indicating one RV. In some embodiments, the HARQ process field has two bits, one bit or no bit, indicating four, two or one HARQ processes, respectively.

According to yet another aspect, a wireless device, WD, is configured to communicate with a network node. The WD is configured to select between a first mode of operation and a second mode of operation. The first mode of operation includes receiving and decoding a first DCI message having a first number of bits. The second mode of operation includes receiving and decoding a second DCI message having a second number of bits less than the first number of bits in at least one of the following fields: an MCS field, an RV field, and a HARQ process field.

According to this aspect, in some embodiments, when there is no RV field, the WD assumes only one RV. In some embodiments, when there is no HARQ process field, the WD assumes only one HARQ process. In some embodiments, the first and second DCI messages include scheduling messages for scheduling a data transmission or a physical downlink shared channel, PDSCH, transmission.

According to another aspect, a method implemented in a wireless device, WD, is provided. The method includes selecting between a first mode of operation and a second mode of operation. The method also includes operating in the selected mode. The first mode of operation includes receiving and decoding a first DCI message having a first number of bits. The second mode of operation includes receiving and decoding a second DCI message having a second number of bits less than the first number of bits in at least one of the following fields: an MCS field, an RV field, and a HARQ process field.

According to this aspect, in some embodiments, when there is no RV field, the WD assumes only one RV. In some embodiments, when there is no HARQ process field, the WD assumes only one HARQ process. In some embodiments, the first and second DCI messages include scheduling messages for scheduling a data transmission or a physical downlink shared channel, PDSCH, transmission.

According to one aspect, a network node is configured to generate a short downlink control information, DCI, message omitting at least one bit of at least one of the following fields: a modulation and coding scheme, MCS, field; a redundancy version, RV, field; and a hybrid automatic repeat request, HARQ, field.

According to one aspect, a network node configured to communicate with a wireless device (WD) is provided. The network node includes processing circuitry configured to generate a short downlink control information, DCI, message omitting at least one bit of at least one of the following fields: a modulation and coding scheme, MCS, field; a redundancy version, RV, field; and a hybrid automatic repeat request, HARQ, field.

According to this aspect, in some embodiments, the short DCI has fewer than 5 MCS field bits. In some embodiments, the MCS field represent only a subset of modulation and coding schemes that may be utilized by the network node. In some embodiments, the subset of modulation and coding schemes is selected based on a channel quality indicator. In some embodiments, the subset is explicitly identified to the WD by signaling from the network node. In some embodiments, there is no RV field. In some embodiments, the RV field is 1 bit. In some embodiments, the HARQ field is less than three bits.

According to another aspect, a method implemented in a network node is provided. The method includes generating a short downlink control information, DCI, message omitting at least one bit of at least one of the following fields: a modulation and coding scheme, MCS, field; a redundancy version, RV, field; and a hybrid automatic repeat request, HARQ, field.

According to this aspect, in some embodiments, the short DCI has fewer than 5 MCS field bits. In some embodiments, the MCS field represent only a subset of modulation and coding schemes that may be utilized by the network node. In some embodiments, the subset of modulation and coding schemes is selected based on a channel quality indicator. In some embodiments, the subset is explicitly identified to the WD by signaling from the network node. In some embodiments, there is no RV field. In some embodiments, the RV field is 1 bit. In some embodiments, the HARQ field is less than three bits.

According to yet another aspect, a wireless device (WD) configured to communicate with a network node is provided. The WD is configured to interpret a short downlink control information, DCI, message having omitted at least one bit of at least one of the following fields: a modulation and coding scheme, MCS, field; a redundancy version, RV, field; and a hybrid automatic repeat request, HARQ, field.

According to this aspect, in some embodiments, a bit in the MCS field indicates one of a subset of MCS. In some embodiments, when there is no RV field, the WD assumes an RV. In some embodiments, when there is no HARQ field only one HARQ process is implied.

According to yet another aspect, a method implemented in a wireless device (WD) is provided. The method includes interpreting a short downlink control information, DCI, message having omitted at least one bit of at least one of the following fields: a modulation and coding scheme, MCS, field; a redundancy version, RV, field; and a hybrid automatic repeat request, HARQ, field.

According to this aspect, in some embodiments, a bit in the MCS field indicates one of a subset of MCS. In some embodiments, when there is no RV field, the WD assumes an RV. In some embodiments, when there is no HARQ field only one HARQ process is implied.

According to another aspect, a network node includes a memory module configured to store a short downlink control information, DCI, message. The network node also includes a DCI generation module configured to generate a short downlink control information, DCI, message omitting at least one bit of at least one of the following fields: a modulation and coding scheme, MCS, field; a redundancy version, RV, field; and a hybrid automatic repeat request, HARQ, field.

According to another aspect, a wireless device includes a memory module configured to store a short downlink control information, DCI, message. The wireless device also includes a DCI interpreter module configured to interpret a short downlink control information, DCI, message having omitted at least one bit of at least one of the following fields: a modulation and coding scheme, MCS, field; a redundancy version, RV, field; and a hybrid automatic repeat request, HARQ, field.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 7 is a flowchart illustrating exemplary methods implemented in a communication system including a host computer, a network node and a wireless device for executing a client application at a wireless device according to some embodiments of the present disclosure;

FIG. 8 is a flowchart illustrating exemplary methods implemented in a communication system including a host computer, a network node and a wireless device for receiving user data at a wireless device according to some embodiments of the present disclosure;

DETAILED DESCRIPTION

Figure 1:
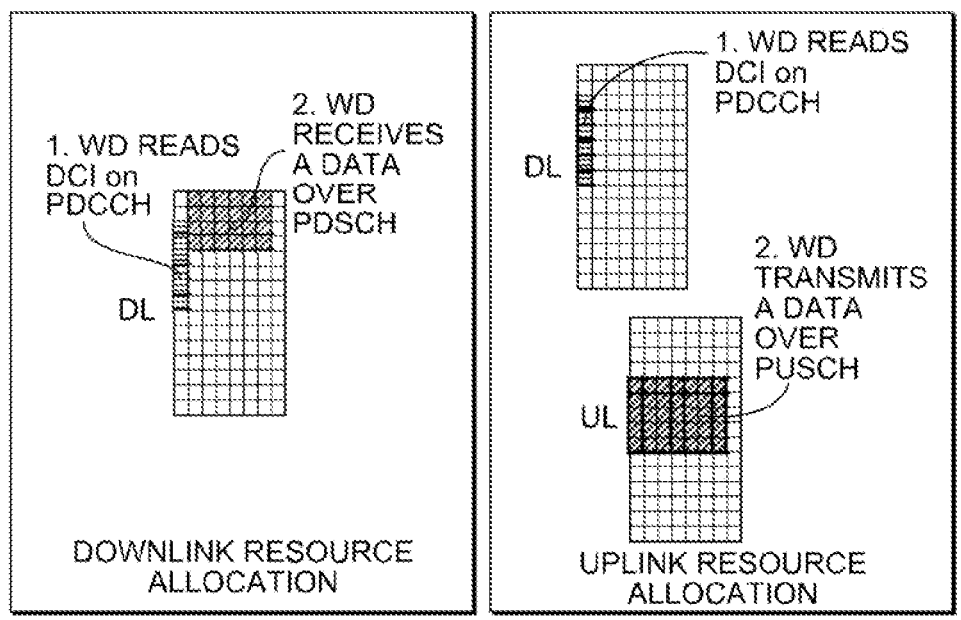
FIG. 1 is a diagram of uplink and downlink processing.

Before describing in detail exemplary embodiments, it is noted that the embodiments reside primarily in combinations of apparatus components and processing steps related to compact DCI generation and signaling based on reduced fields for redundancy versions (RV), modulation and coding schemes (MCS) and hybrid automatic repeat requests (HARD). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, integrated access and backhaul node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

It should be understood that, in some embodiments, signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that it represents signaling and/or information for that channel, and/or that the signaling is interpreted by the transmitter and/or receiver to belong to that channel. Such signaling may generally comply with transmission parameters and/or format/s for the channel.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that the RRC signaling as described herein may indicate what subframes or signals to use for one or more of the measurements described herein and under what conditions and/or operational modes.

Configuring a radio node, in particular a terminal or user equipment or the WD 22, may refer to the radio node being adapted or caused or set and/or instructed to operate according to the configuration. Configuring may be done by another device, e.g., a network node 16 (for example, a radio node of the network like a base station or eNodeB) or network, in which case configuring may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources, or e.g., configuration for performing certain measurements on certain subframes or radio resources. A radio node may configure itself, e.g., based on configuration data received from a network or network node 16. A network node 16 may use, and/or be adapted to use, its circuitry for configuring a WD 22. Allocation information may be considered a form of configuration data. Configuration data may comprise and/or be represented by configuration information, and/or one or more corresponding indications and/or message/s.

Generally, configuring may include determining configuration data representing the configuration and providing, e.g. transmitting, the data to one or more other nodes (parallel and/or sequentially), which may transmit the data further to the radio node (or another node, which may be repeated until the data reaches the wireless device 22). Alternatively, or additionally, configuring a radio node, e.g., by a network node 16 or other device, may include receiving configuration data and/or data pertaining to configuration data, e.g., from another node like a network node 16, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD 22) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD 22) may comprise configuring the WD 22 to perform certain measurements on certain subframes or radio resources and reporting such measurements according to embodiments of the present disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for reduction of the size of the downlink control information, DCI, transmitted by a network node. According to one aspect, a network node is configured to operate in one of two modes, one mode providing a first number of bits in a first DCI message and another mode providing a second number of bits in a second DCI message, the second number of bits being less than the first number of bits in at least one field, the fields including but not limited to: a MCS field; an RV field; and a HARQ process field.

Figure 2:
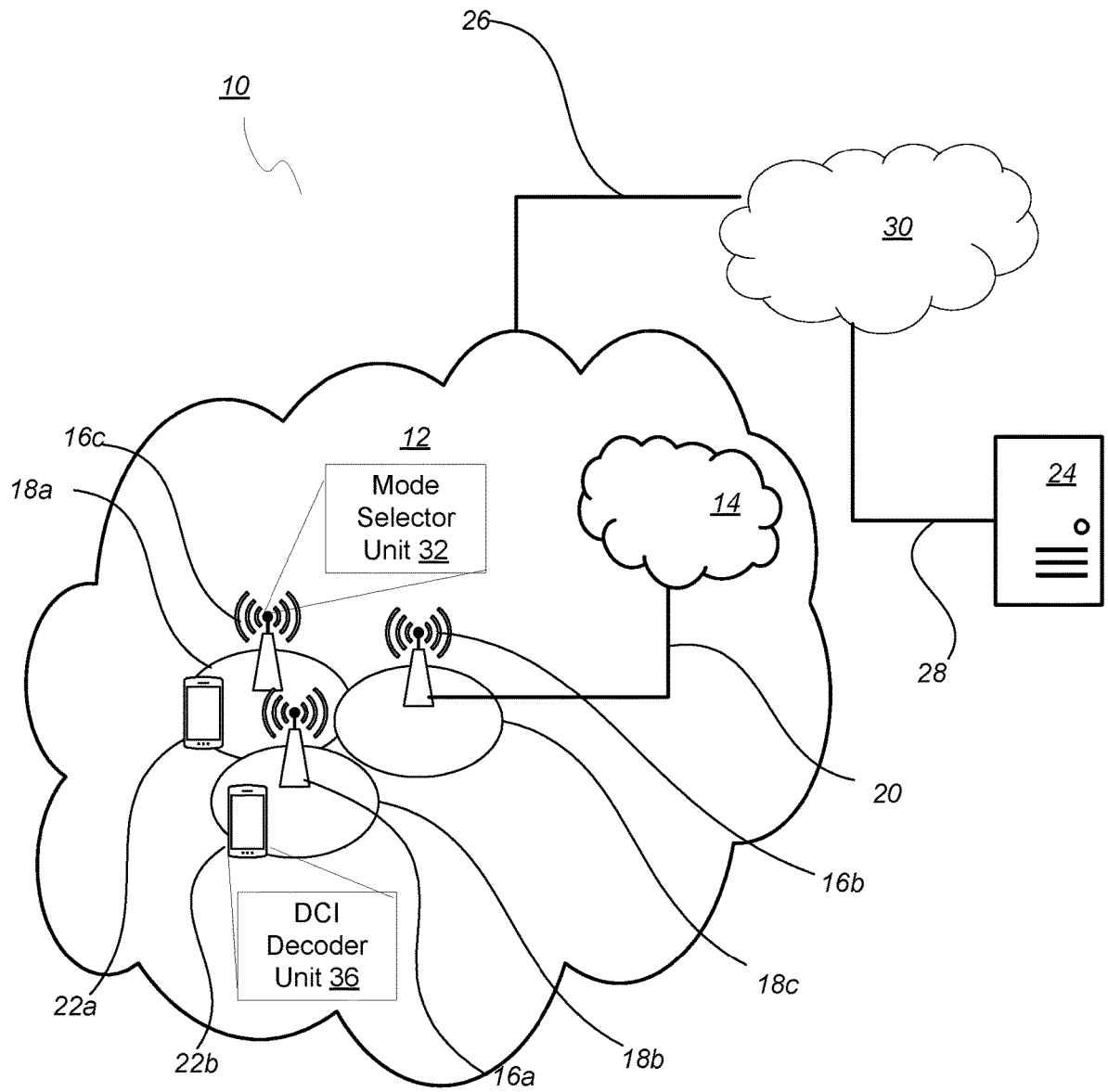
FIG. 2 is a schematic diagram of an exemplary network architecture illustrating a communication system connected via an intermediate network to a host computer according to the principles in the present disclosure.

Returning to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WS 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a mode selector unit 32 which is configured to select between a first mode of operation and a second mode of operation. The selecting may be based on, at least implicitly, a size of the PDCCH and/or on operational conditions and/or reliability requirements and/or configured parameters. A size of the PDCCH may refer to a number of bits of the PDCCH, a number of resource elements needed for transmission of the PDCCH, size in resource elements of the search space or a control resource set for monitoring the PDCCH. In the first mode of operation the network node 16 selects or generates a first DCI message having a first number of bits. In the second mode of operation the network node 16 selects or generates a second DCI message having a second number of bits less than the first number of bits in at least one field of a DCI message, the fields of the DCI message including: an MCS field; an RV field; and a HARQ process field. Note that any field size of a DCI message may be used to define the size of the second DCI message including a field of size "null" (in other words a field size of zero bits). The network node 16 also has a DCI formatting unit 34 (shown in FIG. 3) configured to format the DCI message to have the number of bits corresponding to the selected operating mode. A wireless device 22 is configured to include a DCI decoder unit 36 which is configured to decode the DCI received from the network node. Operation in a mode of operation may further include transmitting the DCI message (in the case of the network node) and communicating with the network node based on the received DCI (in the case of the wireless device). The communicating may optionally include monitoring resources scheduled with the DCI message and/or decoding received signaling based on the MCS field (or implicitly assuming an MCS based on MCS size or presence) and/or RV field, and/or providing HARQ feedback.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and comprising hardware 58 enabling the network node 16 to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include a mode selector unit 32 which is configured to select between a first mode of operation and a second mode of operation. The first mode of operation includes selecting or generating a first DCI message having a first number of bits. The second mode of operation includes selecting or generating a second DCI message having a second number of bits less than the first number of bits in at least one field of a DCI message, the fields of the DCI message including: an MCS field; an RV field; and a HARQ process field. The processing circuitry 68 also has a DCI formatting unit 34 configured to format the DCI message to have the number of bits corresponding to the selected operating node. The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a DCI decoder unit 36 which is configured to decode the DCI received from the network node.

Figure 3:
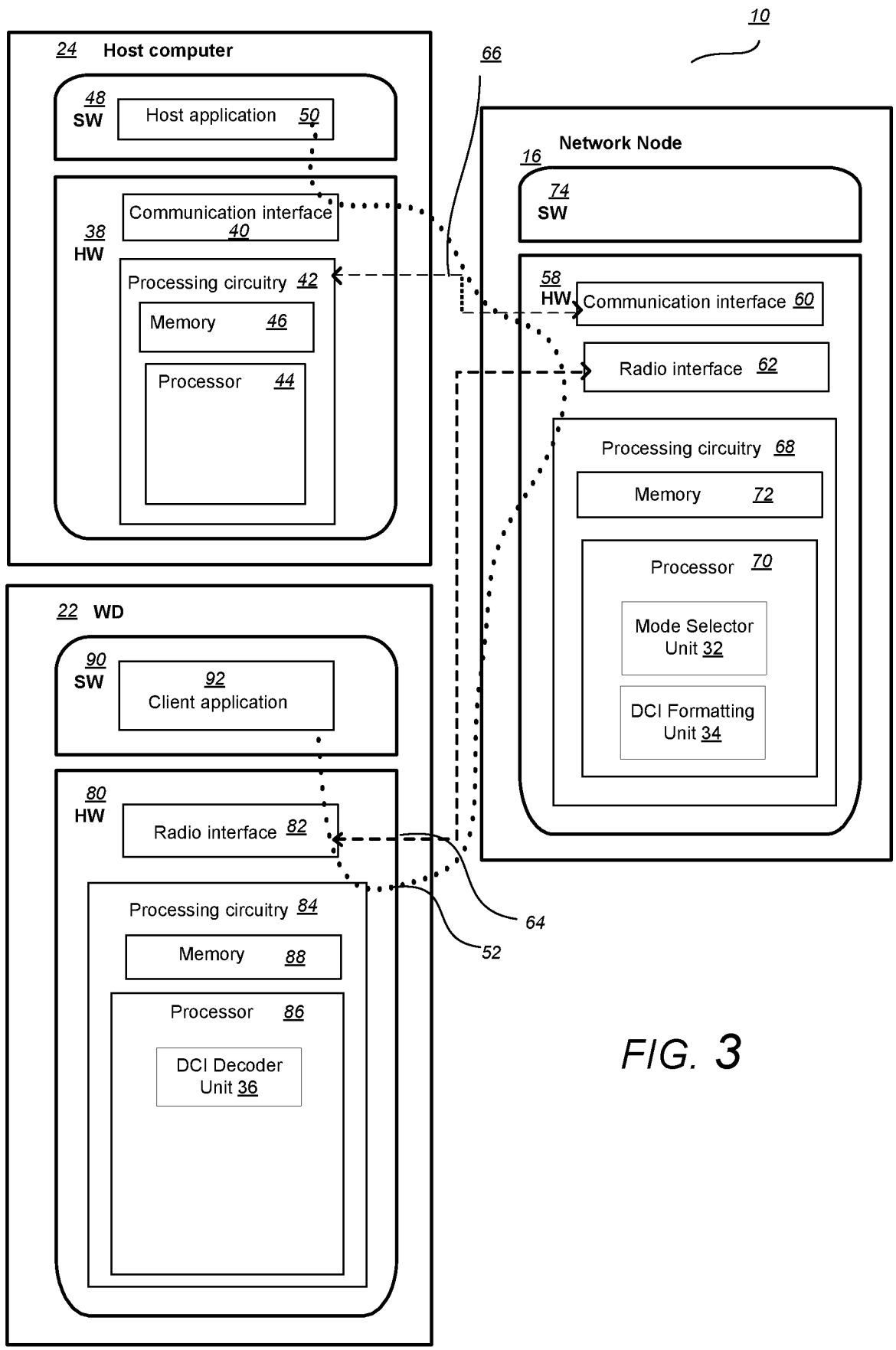
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as the mode selector unit 32, the DCI formatting unit 34, and the DCI decoder unit 36 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 4:
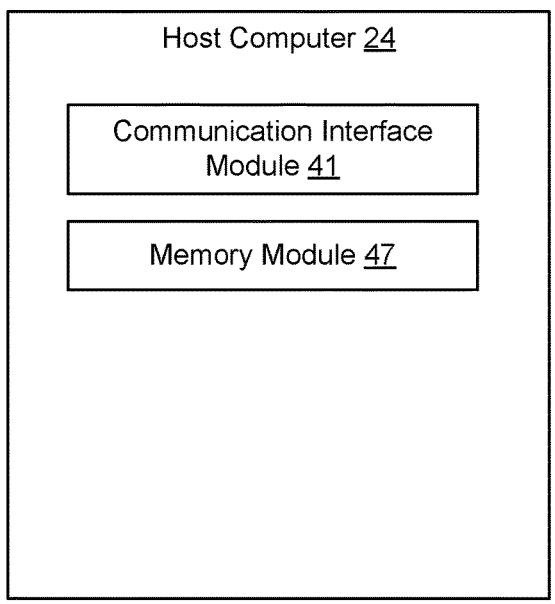
FIG. 4 is a block diagram of an alternative embodiment of a host computer according to some embodiments of the present disclosure.

FIG. 4 is a block diagram of an alternative host computer 24, which may be implemented at least in part by software modules containing software executable by a processor to perform the functions described herein. The host computer 24 include a communication interface module 41 configured to set up and maintain a wired or wireless connection with an interface of a different communication device of the communication system 10. The memory module 47 is configured to store data, programmatic software code and/or other information described herein.

Figure 5:
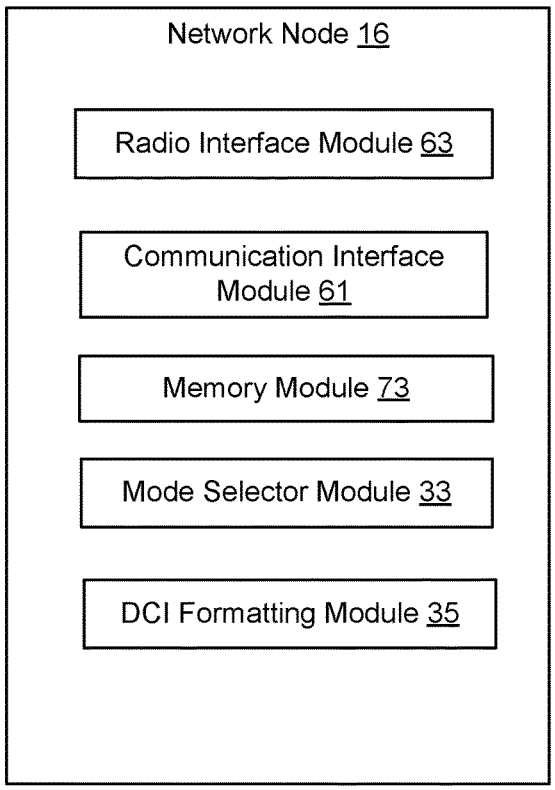
FIG. 5 is a block diagram of an alternative embodiment of a network node according to some embodiments of the present disclosure.

FIG. 5 is a block diagram of an alternative network node 16, which may be implemented at least in part by software modules containing software executable by a processor to perform the functions described herein. The network node 16 includes a radio interface module 63 configured for setting up and maintaining at least a wireless connection 64 with a WD 22 located in a coverage area 18 served by the network node 16. The network node 16 also includes a communication interface module 61 configured for setting up and maintaining a wired or wireless connection with an interface of a different communication device of the communication system 10. The communication interface module 61 may also be configured to facilitate a connection 66 to the host computer 24. The memory module 73 that is configured to store data, programmatic software code and/or other information described herein. The mode selector module 33 is configured to select between the first mode of operation and the second mode of operation as described herein. DCI formatting module 35 is configured to format the number of bits in each field of the DCI message according to the selected operating mode.

Figure 6:
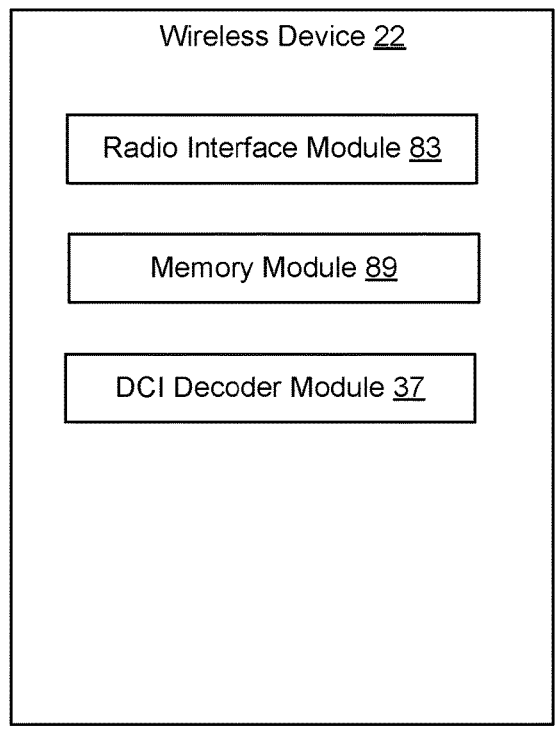
FIG. 6 is a block diagram of an alternative embodiment of a wireless device according to some embodiments of the present disclosure.

FIG. 6 is a block diagram of an alternative wireless device 22, which may be implemented at least in part by software modules containing software executable by a processor to perform the functions described herein. The WD 22 includes a radio interface module 83 configured to set up and maintain a wireless connection 64 with a network node 16 serving a coverage area 18 in which the WD 22 is currently located. The memory module 89 is configured to store data, programmatic software code and/or other information described herein. The DCI decoder module 37 is configured to decode the DCI received from the network node 16.

FIG. 7 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (block S100). In an optional substep of the first step, the host computer 24 provides the user data by executing a host application, such as, for example, the host application 74 (block S102). In a second step, the host computer 24 initiates a transmission carrying the user data to the WD 22 (block S104). In an optional third step, the network node 16 transmits to the WD 22 the user data which was carried in the transmission that the host computer 22 initiated, in accordance with the teachings of the embodiments described throughout this disclosure (block S106). In an optional fourth step, the WD 22 executes a client application, such as, for example, the client application 114, associated with the host application 74 executed by the host computer 24 (block S108).

FIG. 8 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (block S110). In an optional substep (not shown) the host computer 24 provides the user data by executing a host application, such as, for example, the host application 74. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

Figures 9, 10:
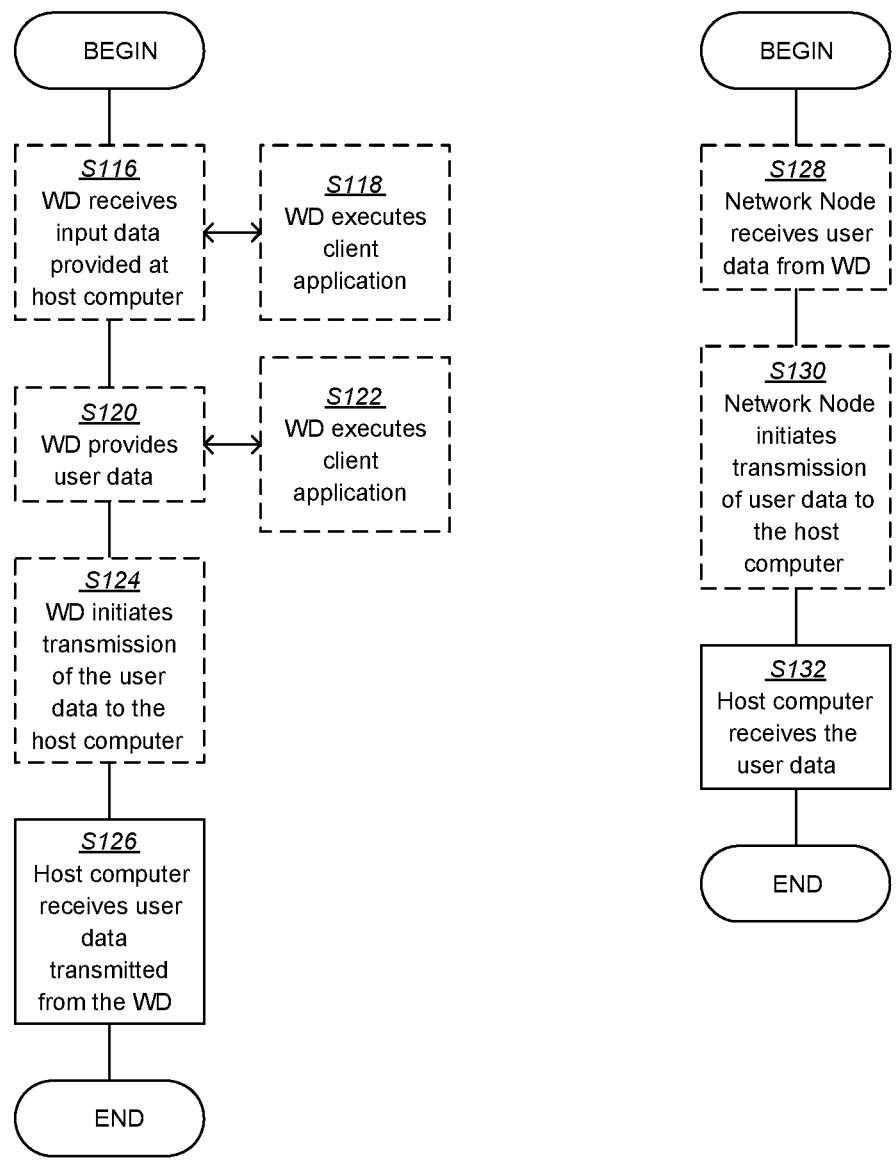
FIG. 9 is a flowchart illustrating exemplary methods implemented in a communication system including a host computer, a network node and a wireless device for receiving user data from the wireless device at a host computer according to some embodiments of the present disclosure.
FIG. 10 is a flowchart illustrating exemplary methods implemented in a communication system including a host computer, a network node and a wireless device for receiving user data at a host computer according to some embodiments of the present disclosure.

FIG. 9 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (block S116). In an optional substep of the first step, the WD 22 executes the client application 114, which provides the user data in reaction to the received input data provided by the host computer 24 (block S118). Additionally or alternatively, in an optional second step, the WD 22 provides user data (block S120). In an optional substep of the second step, the WD 22 provides the user data by executing a client application, such as, for example, client application 114 (block S122). In providing the user data, the executed client application 114 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

FIG. 10 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 11:
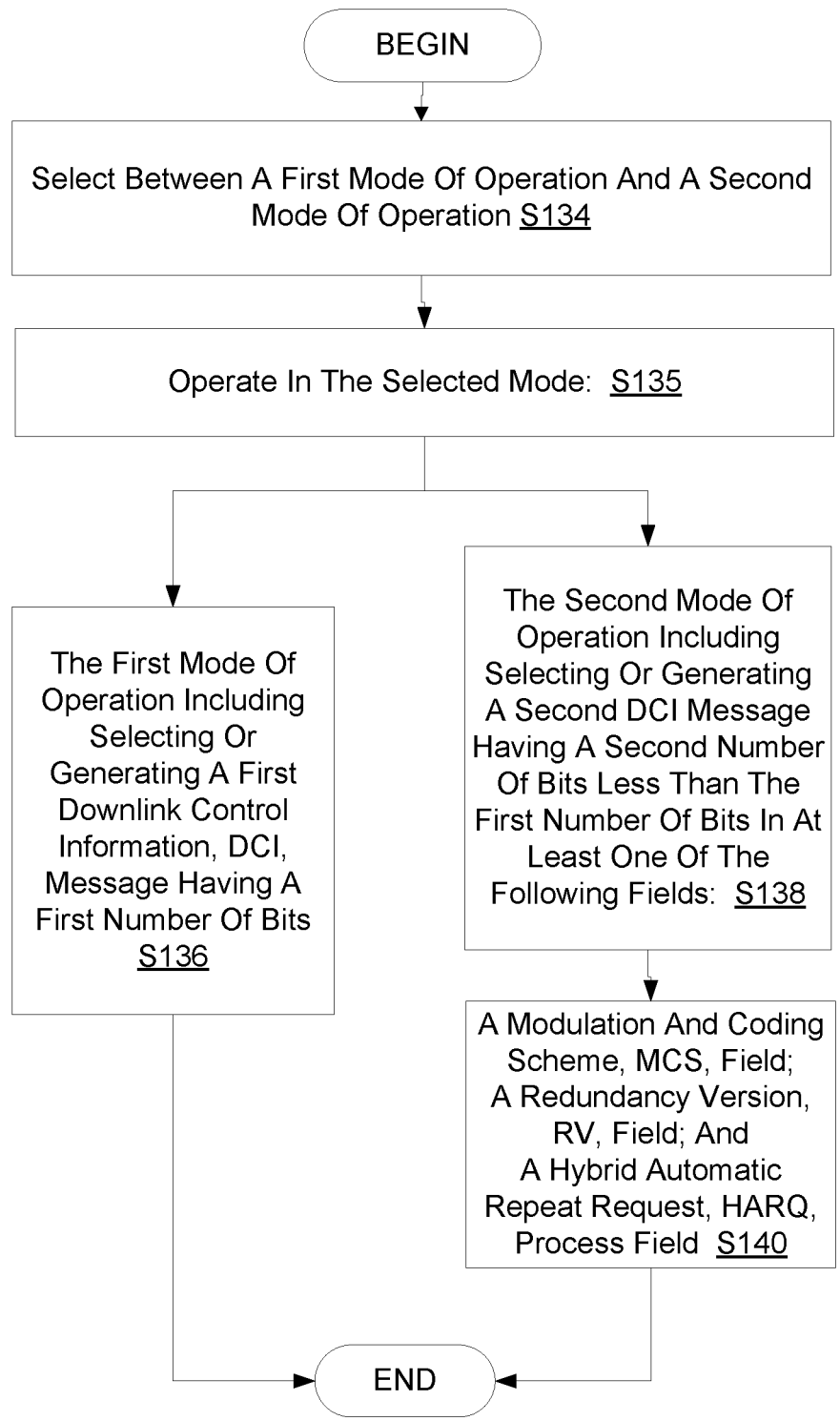
FIG. 11 is a flowchart of an exemplary process in a network node according to some embodiments of the present disclosure.

FIG. 11 is a flowchart of an exemplary process in a network node 16 for generating compact DCI in accordance with the principles of the present disclosure. One or more blocks described herein may be performed by one or more elements of network node 16 such as by one or more of processing circuitry 68 (including the mode selector unit 32 and DCI formatting unit 34), processor 70, radio interface 62 and/or communication interface 60. Network node 16 via processing circuitry 68 and/or processor 70 and/or radio interface 62 and/or communication interface 60 is configured to select between a first mode of operation and a second mode of operation (Block S134). The processor 70 operates in the selected mode (Block S135). The first mode of operation includes selecting or generating, via the processor 70, a first DCI message having a first number of bits (Block S136). The second mode of operation includes selecting or generating a second DCI message having a second number of bits less than the first number of bits in at least one field of a DCI message, the fields of the DCI message including (Block S138): an MCS field, an RV field, and a HARQ process field (Block S140).

Figure 12:
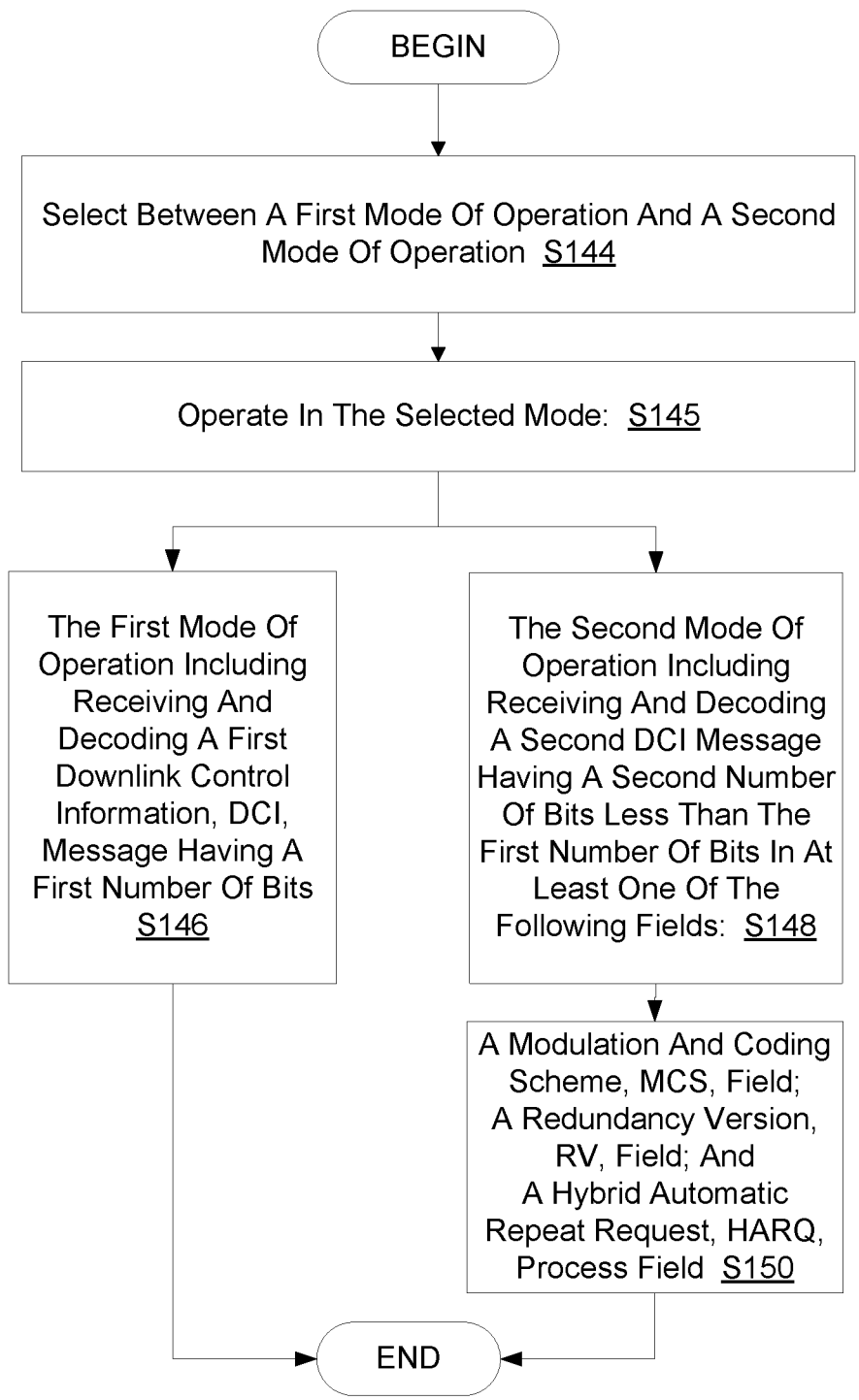
FIG. 12 is a flowchart of an exemplary process in a wireless device according to some embodiments of the present disclosure.

FIG. 12 is a flowchart of an exemplary process in a wireless device 22 according to some embodiments of the present disclosure for decoding compact DCI in accordance with the principles of the present disclosure. One or more blocks described herein may be performed by one or more elements of wireless device 22 such as by one or more of processing circuitry 84 (including the DCI decoder unit 36), processor 86, radio interface 82 and/or communication interface 60. Wireless device 22, via processing circuitry 84 and/or processor 86 and/or radio interface 82 is configured to select between a first mode of operation and a second mode of operation, the selecting being based on signaling from the network node (Block S144). The processor 86 operates in the selected mode (Block S145). The first mode of operation includes receiving, via the radio interface 82, and decoding, via the DCI decoder unit 36, a first DCI message having a first number of bits (Block S146). The second mode of operation includes receiving and decoding a second DCI message having a second number of bits less than the first number of bits in at least one field of a DCI message, the fields of the DCI message including (Block S148): an MCS field, an RV field, and a HARQ process field (Block S150)

Having described the general process flow of arrangements of the disclosure and having provided examples of hardware and software arrangements for implementing the processes and functions of the disclosure, the sections below provide details and examples of arrangements for achieving compact DCI. The compact DCI message generated according to the below-described methods is small in comparison to a legacy DCI size, which makes it possible to achieve lower channel coding rates, thereby increasing reliability of DCI transmissions.

Embodiments: MCS Field Shortening

In legacy LTE and NR, the MCS field in DCI has 5 bits, providing, in principle, 32 combinations of modulation and coding rate that can be signaled to the WD 22. Every MCS has a spectrum efficiency limit and certain level of robustness such that an MCS with highest index is most efficient and at the same time less robust. On the contrary, an MCS with lowest index is least efficient, but most robust. A network node 16 may try to allocate an MCS according to radio channel conditions. Based on the above disclosure, some embodiments format, via the DCI formatting unit 34, an MCS field according to the following:

In one embodiment, the full version of an MCS table or a full version of a new table to be specified in 3GPP can be punctured or down sampled:
  taking even or odd entries from a full MCS table, gives a 4-bit MCS field;
  the MCS table can align with a channel quality index (CQI) table, which has 16 entries, thereby providing a 4-bit MCS field.

In another embodiment, the MCS table can be partitioned into subsets, with each subset applicable to a certain available signal to noise ratio (SNR) range. For example, a partition into two subsets can be done based on good or bad SNR conditions. The subsets may be known to the WD 22 and may be fixed.

In another embodiment, the MCS table can be partitioned into subsets, with each subset corresponding to a different target reliability at the WD 22. For example, a partition into two subsets can be done based on a configured target block error rate (BLER).

In another embodiment, the MCS subset to be used by the network node 16 and WD 22 is fixed, either for the whole transmission period or preconfigured in a semi static way via a radio resource control (RRC) configuration.

In one embodiment, multiple MCS subsets are preconfigured in a semi static way via a RRC configuration:
  Which subset to use is RRC configured or implicitly defined by other parameters such as the configured target BLER.

In another embodiment, the subset to be used by the WD 22 is conditioned with the measured channel quality. Depending on the number of configured subsets, event 1A/1B reporting (for up to two subsets) or a channel quality indicator (CQI) threshold can be used to decide which subset is used.

In another embodiment, the subset to be used for decoding is either implicitly or explicitly encoded in the DCI. Implicit methods include association of the MCS field with a certain bandwidth allocation (high bandwidth means low MCS) or other implicit mechanism. Explicit methods include signaling of the subset using dedicated bits in the DCI message.

The MCS and the CQI reports may be tightly connected and therefore a change in the MCS subset table may be reflected in CQI reports.

In one embodiment, the CQI reports can be configured to follow the MCS used in the subframe/subslot/slot where the channel measurement took place. The WD 22 then proceeds to use the corresponding subset of CQI values from the existing CQI table from the 3GPP specification or any new table to be specified.

In another embodiment, the CQI reports are based on the existing CQI table, i.e., 4-bit long. Based on the received CQI report, the network node 16 chooses an MCS appropriately from the known MCS subset.

Embodiment: RV Field Shortening

Since redundancy versions should be signaled along with MCS to enable incremental redundancy (IR), some embodiments can be applied to the RV field to format, via the DCI formatting unit 34, the RV field according to the following:

In one embodiment, only one redundancy version is used in all transmissions/retransmissions, because in poor radio conditions with rates below 1/3 (for LTE, Turbo Coding) or 1/5 (for NR, low density parity check (LDPC) base graph 2 (BG2)), incremental redundancy may not bring any gain compared to Chase combining. Thus, the RV field can be omitted in this embodiment.

In another embodiment, an order of RV transmissions can be defined in the standard, e.g., (0, 3, 0, 3, 0, 3 etc.). Therefore, the WD 22 can implicitly assume an RV index according to a transmission attempt number.

In another embodiment, two RVs can be used, making the length of the RV 1 bit:
  The RVs with maximum self-decodability, e.g., RV 0 and 3 may be used. This has a benefit of facilitating high reliable HARQ-free transmission or automatic retransmission, especially in scenarios where the first transmission can be missed.

Embodiment: HARQ Process Number Field Shortening

In contrast with streaming traffic, services such as URLLC have a sporadic traffic model, when data arrives periodically or semi-periodically with relatively long pauses in between, e.g., once per second. Moreover, a HARQ timeline for latency sensitive service tends to be as short as possible, which almost eliminates overlapping of two HARQ processes in time. Therefore, the field indicating a HARQ process can be shortened or even omitted, via the DCI formatting unit 34, according to one of the following options:

In one embodiment, the HARQ process field can be 1 or 2 bits, allowing 2 or 4 simultaneous processes.

In another embodiment, the HARQ process field is omitted from the DCI message, allowing only one HARQ process signaling.

Despite shortening or omitting the HARQ process field, some rules are shown below to have a mapping between normal HARQ process enumerations.

In case of omitting or shortening of the HARQ process field, the WD 22 and network node 16 can assume that the compact DCI always signals the process number 0 (or any other allowed number) or maintains a mapping table between signaled and legacy HARQ numbers.

In case of omitting the HARQ process field, the WD 22 and network node 16 can assume that compact DCI always signals the special process dedicated for data transmission such as URLLC.

Thus, some embodiments include a network node 16 configured to communicate with a wireless device, WD 22. The network node 16 is configured to select between a first mode of operation and a second mode of operation. The network node 16 is further configured to operate in the selected mode. The first mode of operation includes selecting or generating a first DCI message having a first number of bits. The second mode of operation includes selecting or generating a second DCI message having a second number of bits less than the first number of bits in at least one field of a DCI message, the fields of the DCI message including: a MCS field, an RV field, and a HARQ process field.

According to this aspect, in some embodiments, the first and second DCI messages include scheduling messages for scheduling a data transmission or a physical downlink shared channel, PDSCH, transmission. In some embodiments, the second DCI message has fewer than 5 MCS bits and indicates a subset of a table of configurable modulation and coding schemes. In some embodiments, a subset of modulation and coding schemes is selected based on a measure of channel quality. In some embodiments, the RV field has one bit or no bit, one bit indicating two RVs and no bit indicating one RV. In some embodiments, the HARQ process field has two bits, one bit or no bit, indicating four, two or one HARQ processes, respectively.

According to another aspect, a method implemented in a network node 16 is provided. The method includes selecting between a first mode of operation and a second mode of operation (Block S134). The method also includes operating in the selected mode (Block S135). The first mode of operation includes selecting or generating a first DCI message having a first number of bits (Block S136). The second mode of operation including selecting or generating a second DCI message having a second number of bits less than the first number of bits in at least one field of a DCI message, the fields of the DCI message including (Block S138): an MCS field, an RV field, and a HARQ process field (Block S140).

According to this aspect, in some embodiments, the first and second DCI messages include scheduling messages for scheduling a data transmission or a physical downlink shared channel, PDSCH, transmission. In some embodiments, the second DCI message has fewer than 5 MCS bits and indicates a subset of a table of configurable modulation and coding schemes. In some embodiments, a subset of modulation and coding schemes is selected based on a measure of channel quality. In some embodiments, the RV field has one bit or no bit, one bit indicating two RVs and no bit indicating one RV. In some embodiments, the HARQ process field has two bits, one bit or no bit, indicating four, two or one HARQ processes, respectively.

According to yet another aspect, a wireless device, WD 22, is configured to communicate with a network node 16. The WD 22 is configured to select between a first mode of operation and a second mode of operation. The WD 22 is also configured to operate in the selected mode. The first mode of operation includes receiving and decoding a first DCI message having a first number of bits. The second mode of operation includes receiving and decoding a second DCI message having a second number of bits less than the first number of bits in at least one field of a DCI message, the fields of the DCI message including: an MCS field, an RV field, and a HARQ process field.

According to this aspect, in some embodiments, when there is no RV field, the WD 22 assumes only one RV. In some embodiments, when there is no HARQ process field, the WD 22 assumes only one HARQ process. In some embodiments, the first and second DCI messages include scheduling messages for scheduling a data transmission or a physical downlink shared channel, PDSCH, transmission.

According to another aspect, a method implemented in a wireless device, WD 22, is provided. The method includes selecting between a first mode of operation and a second mode of operation (Block S144). The method also includes operating in the selected mode (Block S145). The first mode of operation includes receiving and decoding a first DCI message having a first number of bits (Block S146). The second mode of operation includes receiving and decoding a second DCI message having a second number of bits less than the first number of bits in at least one field of a DCI message, the fields of the DCI message including (Block S148): an MCS field, an RV field, and a HARQ process field (Block S150).

According to this aspect, in some embodiments, when there is no RV field, the WD 22 assumes only one RV. In some embodiments, when there is no HARQ process field, the WD 22 assumes only one HARQ process. In some embodiments, the first and second DCI messages include scheduling messages for scheduling a data transmission or a physical downlink shared channel, PDSCH, transmission.

Some embodiments include the following:

Embodiment 1. A network node configured to communicate with a wireless device, WD, the network node configured to, and/or comprising a radio interface and/or comprising processing circuitry configured to:

generate a short downlink control information, DCI, message omitting at least one bit of at least one of the following fields:

a modulation and coding scheme, MCS, field;

a redundancy version, RV, field; and a hybrid automatic repeat request, HARQ, field.

Embodiment 2. The network node of Embodiment 1, wherein the short DCI has fewer than 5 MCS field bits.

Embodiment 3. The network node of Embodiment 1, wherein the MCS field represent only a subset of modulation and coding schemes that may be utilized by the network node.

Embodiment 4. The network node of Embodiment 3, wherein the subset of modulation and coding schemes is selected based on a channel quality indicator.

Embodiment 5. The network node of Embodiment 4, wherein the subset is explicitly identified to the WD by signaling from the network node.

Embodiment 6. The network node of Embodiment 1, wherein there is no RV field.

Embodiment 7. The network node of Embodiment 1, wherein the RV field is 1 bit.

Embodiment 8. The network node of Embodiment 1, wherein the HARQ field is less than three bits.

Embodiment 9. A method implemented in a network node, the method comprising:

generating a short downlink control information, DCI, message omitting at least one bit of at least one of the following fields:

a modulation and coding scheme, MCS, field;

a redundancy version, RV, field; and
a hybrid automatic repeat request, HARQ, field.

Embodiment 10. The method of Embodiment 9, wherein the short DCI has fewer than 5 MCS field bits.

Embodiment 11. The method of Embodiment 9, wherein the MCS field represent only a subset of modulation and coding schemes that may be utilized by the network node.

Embodiment 12. The method of Embodiment 11, wherein the subset of modulation and coding schemes is selected based on a channel quality indicator.

Embodiment 13. The method of Embodiment 11, wherein the subset is explicitly identified to the WD by signaling from the network node.

Embodiment 14. The method of Embodiment 9, wherein there is no RV field.

Embodiment 15. The method of Embodiment 9, wherein the RV field is 1 bit.

Embodiment 16. The method of Embodiment 9, wherein the HARQ field is less than three bits.

Embodiment 17. A wireless device, WD, configured to communicate with a network node, the WD configured to:
interpret a short downlink control information, DCI, message having omitted at least one bit of at least one of the following fields:
a modulation and coding scheme, MCS, field;
a redundancy version, RV, field; and
a hybrid automatic repeat request, HARQ, field.

Embodiment 18. The WD of Embodiment 17, wherein a bit in the MCS field indicates one of a subset of MCS.

Embodiment 19. The WD of Embodiment 17, wherein when there is no RV field, the WD assumes an RV.

Embodiment 20. The WD of Embodiment 17, wherein when there is no HARQ field only one HARQ process is implied.

Embodiment 21. A method implemented in a wireless device, WD, the method comprising:
interpreting a short downlink control information, DCI, message having omitted at least one bit of at least one of the following fields:
a modulation and coding scheme, MCS, field;
a redundancy version, RV, field; and
a hybrid automatic repeat request, HARQ, field.

Embodiment 22. The method of Embodiment 21, wherein a bit in the MCS field indicates one of a subset of MCS.

Embodiment 23. The method of Embodiment 21, wherein when there is no RV field, the WD assumes an RV.

Embodiment 24. The method of Embodiment 21, wherein when there is no HARQ field only one HARQ process is implied.

Embodiment 25. A network node, comprising:
a memory module configured to store a short downlink control information, DCI, message; and
a DCI generation module configured to generate a short downlink control information, DCI, message omitting at least one bit of at least one of the following fields:
a modulation and coding scheme, MCS, field;
a redundancy version, RV, field; and
a hybrid automatic repeat request, HARQ, field.

Embodiment 26. A wireless device, comprising:
a memory module configured to store a short downlink control information, DCI, message; and
a DCI interpreter module configured to interpret a short downlink control information, DCI, message having omitted at least one bit of at least one of the following fields:
a modulation and coding scheme, MCS, field;
a redundancy version, RV, field; and
a hybrid automatic repeat request, HARQ, field.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

Abbreviation Explanation

3GPP 3rd Generation Partnership Project
AL Aggregation Level
CCE Control Channel Elements
CQI Channel Quality Indicator
DCI Downlink Control Information
DL Downlink
HARQ Hybrid Automatic Repeat Request
LTE Long Term Evolution
MCS Modulation and Coding Scheme
NR New Radio
PDCCH Physical Downlink Control Channel
PDSCH Physical Downlink Shared Channel
PUSCH Physical Uplink Shared Channel
RRM Radio Resource Management
RV Redundancy Version
UE User Equipment
UL Uplink
URLLC Ultra Reliable Low Latency Communication It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node for communicating with a wireless device, WD, the network node comprising processing circuitry that causes the network node to:
select between a first mode of operation and a second mode of operation; and
operate in the selected mode:
the first mode of operation including one of selecting and generating a first downlink control information, DCI, message having a first number of bits; and
the second mode of operation including one of selecting and generating a second DCI message having a second number of bits less than the first number of bits in at least one of the following fields:
a modulation and coding scheme, MCS, field, the MCS field indicating an MCS subset of a table of configurable modulation and coding schemes, the MCS subset being selected based in part on a measure of channel quality;
a redundancy version, RV, field; and
a hybrid automatic repeat request, HARQ, process field; and
the first and second DCI messages including scheduling messages for scheduling one of a data transmission and a physical downlink shared channel, PDSCH, transmission.

2. The network node of claim 1, wherein the second DCI message has fewer than 5 MCS bits.

3. The network node of claim 1, wherein the RV field has one of one bit and no bit, one bit indicating two RVs and no bit indicating one RV.

4. The network node of claim 1, wherein the HARQ process field has one of two bits, one bit and no bit, indicating one of four, two and one HARQ processes, respectively.

5. A method implemented in a network node, the method comprising:
selecting between a first mode of operation and a second mode of operation; and
operating in the selected mode:
the first mode of operation including one of selecting and generating a first downlink control information, DCI, message having a first number of bits; and
the second mode of operation including one of selecting and generating a second DCI message having a second number of bits less than the first number of bits in at least one of the following fields:
a modulation and coding scheme, MCS, field, the MCS field indicating an MCS subset of a table of configurable modulation and coding schemes, the MCS subset being selected based in part on a measure of channel quality;
a redundancy version, RV, field; and
a hybrid automatic repeat request, HARQ, process field; and
the first and second DCI messages including scheduling messages for scheduling one of a data transmission and a physical downlink shared channel, PDSCH, transmission.

6. The method of claim 5, wherein the second DCI message has fewer than 5 MCS bits.

7. The method of claim 5, wherein the RV field has one of one bit and no bit, one bit indicating two RVs and no bit indicating one RV.

8. The method of claim 5, wherein the HARQ process field one of two bits, one bit and no bit, indicating one of four, two and one HARQ processes, respectively.

9. A wireless device, WD, for communicating with a network node, the WD comprising processing circuitry that causes the WD to:
select between a first mode of operation and a second mode of operation, the selecting being based on signaling from the network node; and
operate in the selected mode:
the first mode of operation including receiving and decoding a first downlink control information, DCI, message having a first number of bits; and
the second mode of operation including receiving and decoding a second DCI message having a second number of bits less than the first number of bits in at least one of the following fields:
a modulation and coding scheme, MCS, field, the MCS field indicating an MCS subset of a table of configurable modulation and coding schemes, the MCS subset being selected based in part on a measure of channel quality;
a redundancy version, RV, field; and
a hybrid automatic repeat request, HARQ, process field; and
the first and second DCI messages including scheduling messages for scheduling one of a data transmission and a physical downlink shared channel, PDSCH, transmission.

10. The WD of claim 9, wherein, when there is no RV field, the WD assumes only one RV.

11. The WD of claim 9, wherein, when there is no HARQ process field, the WD assumes only one HARQ process.

12. A method implemented in a wireless device, WD, the method comprising:
selecting between a first mode of operation and a second mode of operation, the selecting being based on radio resource control, RRC, signaling from the network node; and
operating in the selected mode:
the first mode of operation including receiving and decoding a first downlink control information, DCI, message having a first number of bits, and
the second mode of operation including receiving and decoding a second DCI message having a second number of bits less than the first number of bits in at least one of the following fields:
a modulation and coding scheme, MCS, field, the MCS field indicating an MCS subset of a table of configurable modulation and coding schemes, the MCS subset being selected based in part on a measure of channel quality;
a redundancy version, RV, field; and
a hybrid automatic repeat request, HARQ, process field; and
the first and second DCI messages including scheduling messages for scheduling one of a data transmission and a physical downlink shared channel, PDSCH, transmission.

13. The method of claim 12, wherein, when there is no RV field, the WD assumes only one RV.

14. The method of claim 12, wherein, when there is no HARQ process field, the WD assumes only one HARQ process.

* * * * *